Sept. 21, 1937. J. H. STANSBURY 2,093,985
LABEL FOR CANNED GOODS
Filed June 22, 1937  2 Sheets-Sheet 1
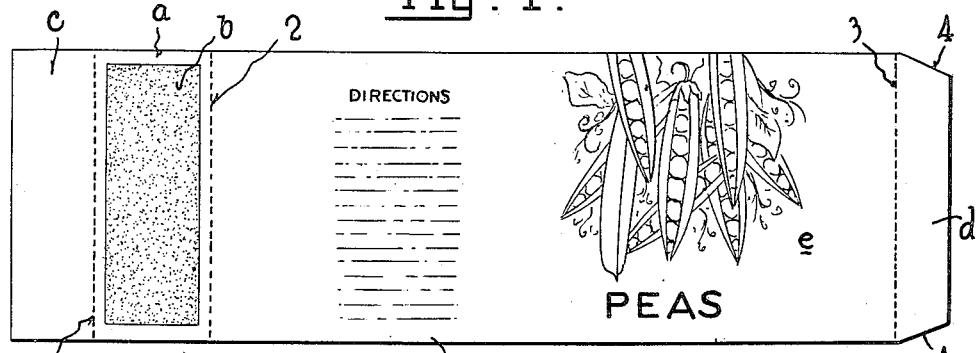
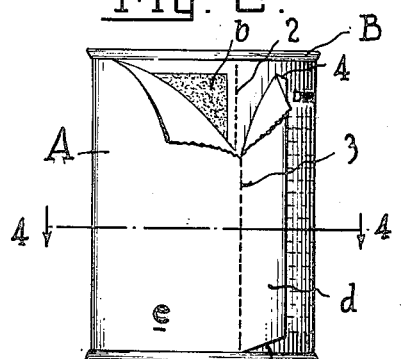
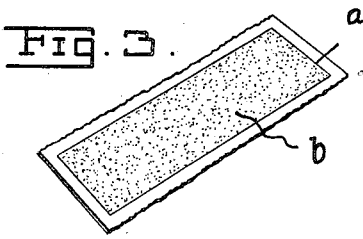
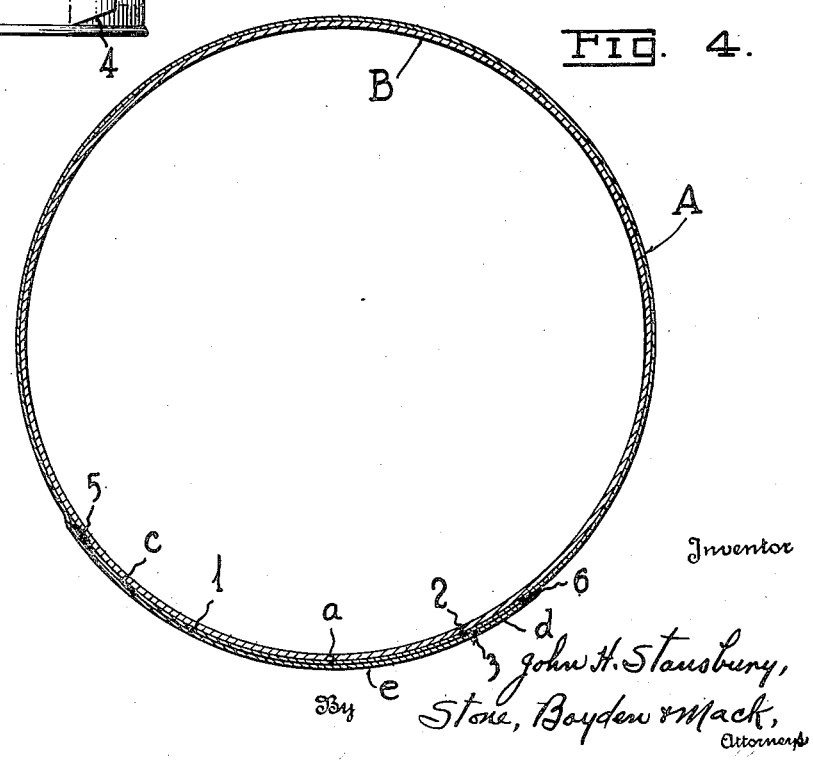
Inventor
John H. Stansbury,
By Stone, Boyden & Mack,
Attorneys

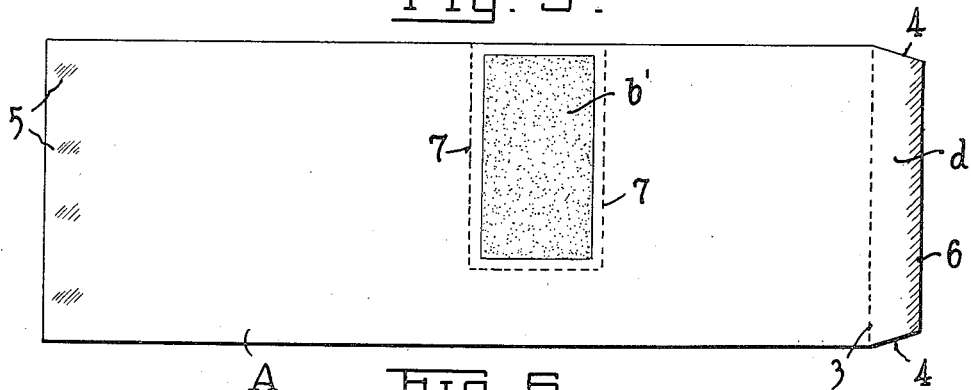
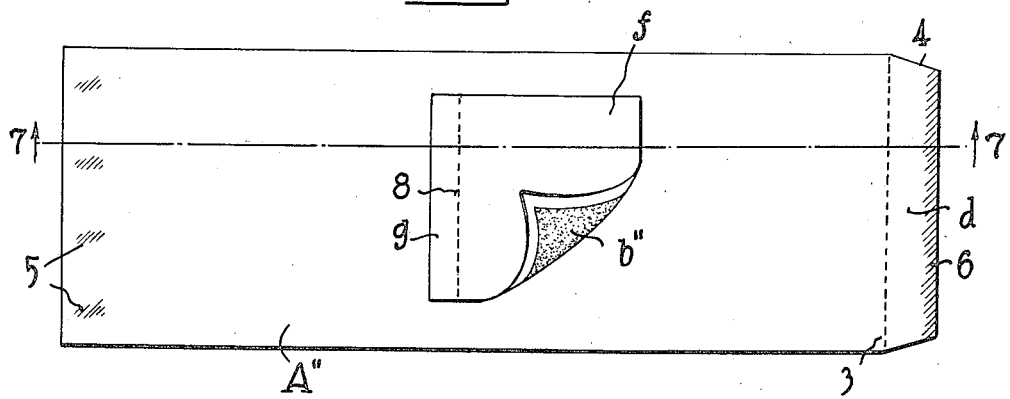
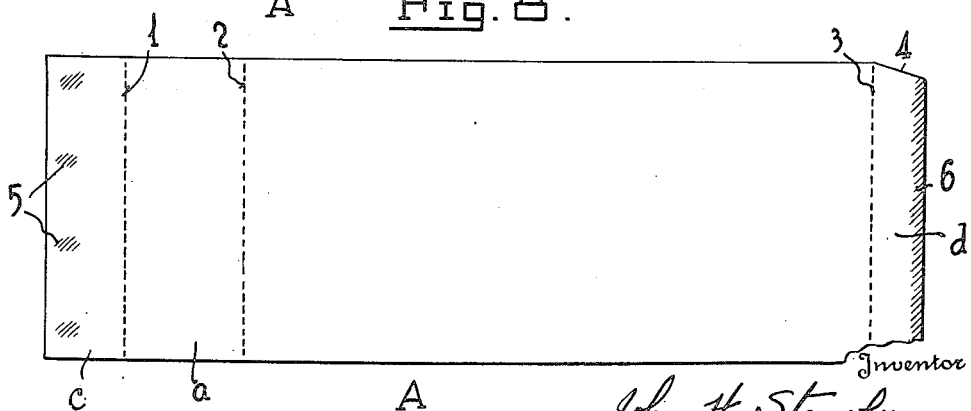

Patented Sept. 21, 1937

2,093,985

UNITED STATES PATENT OFFICE 2,093,985

LABEL FOR CANNED GOODS

John Herbert Stansbury, Baltimore, Md., assignor to The National Color Printing Company, Inc., Baltimore, Md., a corporation of Maryland Application June 22, 1937, Serial No. 149,719

16 Claims. (Cl. 40—2)

This invention relates to labels for containers, and more particularly for containers used in the canning of food products.

Most fruits and vegetables which have a natural bright color, retain this color well when cooked in the usual way, at ordinary boiling temperatures. In the canning of such fruits and vegetables, however, the processing temperatures employed are very much higher, and because of these high temperatures much of the natural coloring matter originally contained in the food products is destroyed.

Thus green vegetables such as peas and beans of various kinds, after having been processed at high temperatures, are found to have lost their attractive bright green color, and red fruits, such, for example, as strawberries, when processed at high temperatures, such as those employed in canning and preserving, usually change to an unattractive brownish color.

Owing to regulations connected with the administration of the pure food laws, the artificial coloring of such canned fruits and vegetables by the packer is usually prohibited.

The object of the present invention is to provide means whereby the purchaser of such canned fruits and vegetables may restore to them their original bright color before serving, and thus render them much more attractive in appearance.

To this end, I propose to provide an improved label for canned food products, and to combine with such label the proper amount of a suitable water soluble coloring material required to restore the natural color of the contents of the can to which it is applied, which coloring material is adapted to be introduced into the contents of the can.

In order that the invention may be readily understood, reference is had to the accompanying drawings, forming part of this specification, and in which:

Fig. 1 is a flat or developed view of the outside of a label embodying the invention;

Fig. 2 is a side elevation of a can showing my improved label applied thereto, and illustrating the label as partially removed;

Fig. 3 is a perspective view of the color carrying panel itself after it has been detached from the label shown in Fig. 1;

Fig. 4 is a transverse section on an enlarged scale, substantially on the line 4—4 of Fig. 2, showing how my improved label is applied to the can;

Fig. 5 is a view similar to Fig. 1, but illustrating a modified construction, and showing the inside of the label;

Fig. 6 is a view similar to Fig. 5, but showing a still further modified construction;

Fig. 7 is a longitudinal section on the line 7—7 of Fig. 6; and

Fig. 8 is a view of the reverse side of the label shown in Fig. 1.

Referring to the drawings in detail, and first to Figs. 1, 2, 3, 4, and 8, the label in its entirety, which is usually made of paper or like flexible sheet material, is designated at A. At one end of the label is a panel $c$ and adjacent thereto is another panel $a$, the panel $a$ being connected with the panel $c$ on the one side and the body of the label on the other side by weakened score or tear lines 1 and 2.

On the panel $a$, I place a coating $b$ of some suitable water soluble coloring composition containing a dye. In the case of green vegetables, such, for example, as green peas, string beans, lima beans, spinach, etc., I employ a green dye.

It will, of course, be understood that this dye or coloring material is harmless and tasteless and comprises compounds which have been certified by the Food and Drug Administration as suitable for human consumption. Thus, for example, the necessary green color may be obtained by combining in suitable proportions the orange dyestuff known as tartrazine and a blue dyestuff known as brilliant blue. By varying the proportion of these ingredients, different shades of green may of course be obtained.

Preferably, and for convenience in applying, these dyestuffs are mixed with glycerine and gum arabic to form a composition in the nature of a water soluble printing ink, the proportions which have been found to be satisfactory being 32% of the dyestuffs combined with 56% of glycerine and 12% of gum arabic.

This coloring material having been prepared as above indicated, is applied to the label by means of a separate printing press, as an entirely distinct operation from the other printed matter which commonly appears on labels.

At the opposite end of the label is a third panel $d$ connected with the main body of the label by a weakened tear line 3. As clearly shown in Fig. 1, and for a purpose hereinafter explained, the corners of the panel $d$ are bevelled off as shown at 4, thus making the end of the panel $d$ considerably narrower than the main body of the label.

By reference to Fig. 8, it will be seen that, in applying the label to a can or the like, there is placed upon the rear surface of the panel c a number of spots of adhesive 5, commonly known as "pick-up" gum. These cause the panel c to adhere to the can or container, and these spots 5 are the only points at which the label is attached to the can. In Fig. 4, these spots 5 of pick-up gum are shown in solid black. The label extends from this point in a counter-clockwise direction around the can and the end bearing the panel d overlaps the other end of the label. To the extreme edge of the panel d is then applied a strip of adhesive 6, as shown in Fig. 8, and this adheres to the main body of the label at a point adjacent the panel carrying the "directions".

In other words, by reference to Fig. 4, it will be seen that the portion of the label designated e overlies the panel a carrying the coloring material b, and that, as clearly shown in Fig. 2, the extreme edge of the panel d lies somewhere between the tear line 2 and the "Directions" panel. As hereinafter more fully explained, the purchaser removes the label from the can and thereupon detaches the panel a, carrying the coloring matter, from the rest of the label. This panel a, as shown in Fig. 3, is then placed in the saucepan with the contents of the can, such contents having previously been heated to the boiling point. The color bearing panel is allowed to remain for about thirty seconds, and then removed. At the expiration of a short time, the contents of the can will have absorbed the dye and will be restored to their original bright color. The contents may then be rinsed with hot water and are thereupon ready to serve.

From the foregoing, it will be seen that it is desirable to be able to readily remove the entire label from the can, and for this reason it is important to exercise care to see that the label is not secured to the can at any point other than at the spots 5.

If the panel d to which the adhesive 6 is applied were of the full width of the label, there would be danger, when this panel is pressed down, that the adhesive would exude from the side edges and might find its way between the main body of the label and the can, thus causing the label to stick at that point. In order to prevent this, I bevel the ends of the panel d so as to make it narrower than the main body of the label, as indicated at 4. With this construction, any adhesive that may exude from the edges of this panel will not extend beyond the main body of the label, and the danger of the adhesive getting under the label at this point is thus eliminated.

The bevelled ends 4 also facilitate the removal of the label from the can. A sharp instrument, such as the point of a knife, may be inserted under one of these bevelled ends in such manner as to cause the label to tear along the weakened line 3, as shown in Fig. 2. When it has been separated along this line, the entire label, at least back beyond the line 1, will freely unroll from the can, and the panel a may then be separated by tearing along the lines 1 and 2.

It will further be particularly noted by reference to Figs. 2 and 4 that the coloring matter b carried by the panel a is completely enclosed and protected, by reason of the fact that the portion e of the label overlaps it. Thus when the label is removed from the can, the panel a is always fresh and clean and is thus in suitable condition to be placed in the saucepan with the contents of the can. It will also be seen that the coloring matter b is, in this arrangement, placed on the outer surface of the label, out of contact with the walls of the can, the coloring matter being held between the portion e of the label and the panel a.

In Fig. 5, I have shown a slightly different arrangement. In this, the coloring matter b' is placed as a coating on the inside of the label, and is confined between the label and the wall of the can. Weakened tear lines 7 are provided as before, so that when the label is removed, the panel carrying the coloring matter may be readily detached from the rest of the label.

Fig. 6 shows still another possible arrangement in which the coloring matter b'', instead of being placed upon the label itself, is formed as a coating upon a separate panel f. At one end this panel is provided with a strip g which may be secured to the inside of the label by means of adhesive, and a weakened tear line 8 is provided so that the panel f may be readily torn off, after the label has been detached from the can. In this case, also, the coloring matter is confined between the label and the can, but is not in contact with the walls of the can.

As a further possible modification, a separate paper panel such as f carrying the coloring matter may simply be enclosed between the label and the can, without being attached to the label.

Instead of applying the coloring matter to the label or other paper sheet as a coating, I may, in some cases, simply impregnate the paper with the water soluble dye itself. When such an impregnated piece of paper is introduced into the contents of the can, the dye readily dissolves out of it, and is absorbed by the food product.

In all of the forms of the invention, however, the coloring matter is carried by the paper and is held or associated with the can by means of the label, and when the label is removed from the can, the paper panel carrying the coloring matter may be removed and placed in a receptacle with the contents of the can.

In the case of red fruits such as strawberries and the like, I of course use a suitable red dye instead of green.

It will thus be seen that I have provided a simple and practical method by which the purchaser of canned fruits and vegetables which have lost their color may restore to them their original attractive appearance, and it is thought that the many advantages of my invention will be readily appreciated by those skilled in such matters.

What I claim is:

1. The combination with a container, of a label applied to the same, and a definite quantity of a water soluble dye carried by a panel of flexible sheet material held by said label, and separable therefrom and from the container.

2. The combination with a container, of a label applied to the same, and a definite quantity of a water soluble dye in the form of a surface coating over a sheet of definite area held by said label, said sheet being separable from said label.

3. The combination with a label adapted to be applied to a container, of a paper panel carried by and separable from said label, and a coating of water soluble coloring matter on said panel.

4. The combination with a label adapted to be applied to a container, of a paper panel carried by and separable from said label, and a coating of water soluble coloring matter on said panel, the coated surface of said panel, when applied to the container, being disposed inside of said label and thus protected from contact with outside objects.

5. The combination with a container, of a label applied to the same, a panel of flexible sheet material carried by and separable from said label, and a coating of water soluble coloring matter on said panel, and confined between the label and container wall.

6. The combination with a label adapted to be applied to a container, of a quantity of water soluble dye applied as a coating directly on a portion of said label separable from the remainder of the label.

7. The combination with a container, of a label applied thereto, and a quantity of water soluble dye applied to and carried by one portion of said label of definite area and covered by another portion thereof.

8. The combination with a container, of a label encircling the same, with its ends overlapping, and a quantity of water soluble coloring matter applied to a definite area of the label near one end, the other end of said label covering said area.

9. The combination with a container, of a label encircling the same, with its ends overlapping, and coloring matter in the form of a water soluble printing ink applied to the outer side of a separable panel of definite area near one end of the label, the other end of said label covering said panel.

10. A label having applied thereto, over a panel of definite area, coloring material containing a dye, said label being formed with weakened tear lines adjacent said panel, whereby said panel carrying the dye may be detached from the rest of the label.

11. The combination with a container, of a label encircling the same and having one end only attached to the container by adhesive, a panel adjacent said end having coloring matter applied thereto, the other end of said label overlapping said panel and secured to the body of the label by adhesive, said panel being free of adhesive and removable from the remainder of the label and from the container.

12. A label for canned food products, said label carrying a detachable panel bearing a harmless, tasteless, water soluble composition containing a dye.

13. A label for canned food products, said label having a detachable panel carrying a harmless, tasteless, water soluble composition containing a dye.

14. A label for cans containing food products, a portion of definite area of said label itself carrying a harmless, tasteless water soluble coloring composition, said portion being detachable and capable, when introduced into the food product contained in the can of coloring the same.

15. The combination with a container, of a sheet of paper or the like having a panel of definite area carrying a special water soluble dye, different from and in addition to the ink of any printed matter, and secured to said container.

16. The combination with a container, of a label encircling the same with its ends overlapping, said label having a transversely extending weakened tear line adjacent its outer end, the extreme outer end of said label beyond said tear line being secured by adhesive to the main body thereof, the said outer end portion of the label to which the adhesive is applied having bevelled corners adjacent said tear line whereby all danger of the adhesive exuding beyond the side edges of the label is eliminated, and the tearing off of the label along said weakened line facilitated.

JOHN H. STANSBURY.